(12) United States Patent
Wang

(10) Patent No.: US 8,777,150 B2
(45) Date of Patent: Jul. 15, 2014

(54) CONVERTIPLANE

(75) Inventor: James Wang, Samarate (IT)

(73) Assignee: Agustawestland S.p.A., Samarate (IT)

( * ) Notice: Subject to any disclaimer, the term of this patent is extended or adjusted under 35 U.S.C. 154(b) by 177 days.

(21) Appl. No.: 13/560,219

(22) Filed: Jul. 27, 2012

(65) Prior Publication Data
US 2013/0026305 A1 Jan. 31, 2013

(30) Foreign Application Priority Data

Jul. 29, 2011 (EP) .................................. 11425210

(51) Int. Cl.
*B64C 27/22* (2006.01)
*B64C 39/00* (2006.01)
*B64C 29/00* (2006.01)
*B64C 15/12* (2006.01)
*B64C 27/52* (2006.01)

(52) U.S. Cl.
USPC ............. 244/7 R; 244/6; 244/12.4; 244/23 B; 244/56; 244/66

(58) Field of Classification Search
USPC ............... 244/12.4, 23 A, 23 B, 17.25, 56, 66
See application file for complete search history.

(56) References Cited

U.S. PATENT DOCUMENTS

| | | | | |
|---|---|---|---|---|
| 2,974,900 A * | 3/1961 | Morris et al. | ................ | 244/12.4 |
| 3,061,242 A * | 10/1962 | Zurawinski et al. | ........ | 244/23 A |
| 3,284,027 A * | 11/1966 | Mesniere | ..................... | 244/12.4 |
| 3,335,977 A * | 8/1967 | Meditz | ......................... | 244/12.4 |
| 3,360,217 A * | 12/1967 | Trotter | ........................ | 244/12.4 |
| 6,892,980 B2 * | 5/2005 | Kawai | .......................... | 244/12.4 |
| 7,874,513 B1 * | 1/2011 | Smith | ........................ | 244/12.4 |
| 8,016,226 B1 * | 9/2011 | Wood | .......................... | 244/23 A |
| 8,152,096 B2 * | 4/2012 | Smith | ............................ | 244/60 |
| 2003/0080242 A1 * | 5/2003 | Kawai | .......................... | 244/12.4 |

FOREIGN PATENT DOCUMENTS

EP 1057724 12/2000

* cited by examiner

*Primary Examiner* — Philip J Bonzell
(74) *Attorney, Agent, or Firm* — Leason Ellis LLP

(57) ABSTRACT

There is described a convertiplane comprising a pair of semi-wings, a first and a second rotor which may rotate about relative first axes and tilt about relative second axes together with first axes with respect to semi-wings between a helicopter mode and an aeroplane mode; first axes are, in use, transversal to a longitudinal direction of convertiplane in helicopter mode, and are, in use, substantially parallel to longitudinal direction in aeroplane mode; first and second rotors may tilt about relative second axes independently of each other.

6 Claims, 11 Drawing Sheets

CONVERTIPLANE

The present invention relates to a convertiplane, i.e. a hybrid aircraft with adjustable rotors, capable of selectively assuming an "aeroplane" configuration, in which the rotors are positioned with their axes substantially parallel to the longitudinal axis of the aircraft, and a "helicopter" configuration, in which the rotors are positioned with their axes substantially vertical and crosswise to the longitudinal axis of the aircraft, so as to combine the advantages of a fixed-wing turboprop aircraft and a helicopter.

The ability to adjust its rotors as described enables a convertiplane to take off and land like a helicopter, i.e. with no need for a runway and along extremely steep trajectories, to minimize ground noise and, for example, even take off and land in urban areas; and to fly like an aeroplane capable of reaching and maintaining a cruising speed of roughly 500 km/h, or at any rate higher than the roughly 300 km/h cruising speed of a helicopter, and a typical cruising height of 7500 metres, which is roughly twice that of a helicopter, and enables it to fly above most cloud formations and atmospheric disturbance.

In other words, with respect to a conventional helicopter, a convertiplane has the advantages of almost twice the cruising speed; substantially twice the flying distance and time for a given payload and fuel supply, thus making it cheaper to operate; and over twice the cruising height, thus making it insensitive to weather conditions (clouds, turbulence) over most of the flight. With respect to a conventional aeroplane, on the other hand, a convertiplane has the advantages of being able to hover, and to take off and land in confined spaces, even in urban areas.

BACKGROUND OF THE INVENTION

At present, substantially two convertiplane configurations are known: "Tilt Rotor", and "Wing Rotor".

In the "Tilt Rotor" configuration, the semi-wings remain substantially fixed, and only the motor-rotor assemblies rotate relative to the semi-wings.

Furthermore, the tilt mechanism comprises a pair of actuators for tilting relative rotors and an shaft which connects the actuators.

Examples of "Tilt Rotor" configuration and of relative tilt mechanism are shown in U.S. Pat. No. 6,220,545 or in US-A-2009/0256026.

In the "Tilt Wing" configuration, the rotor attitude is adjusted by rotating the semi-wing and rotors system assembly as a whole. An example of "Tilt Wing" configuration is shown in EP-A-1057724.

Therefore, both in the "Tilt-Rotor" and in the "Tilt-Wing" configuration, the tilting of the rotors is simultaneously.

In both the configuration, each rotor substantially comprises a shaft rotating about its own axis and a plurality of blades which are articulated onto the shaft.

Each blade has a variable angle of attack, i.e. a variable angle between a reference line on such blade and a vector defining the relative motion between the blade and air.

Known convertiplanes comprise a cyclic control for changing the angles of attack of all the blades cyclically during the rotation of the blades about the axis of the shaft. In other words, the angle of attack of the blades changes on the basis of the angular position of the blades relative to the axis of the shaft.

The cyclic control results in the tilting of the rotor disk relative to the fixed axis of the shaft in a particular direction. Accordingly, the tilting of the rotor disk generates a thrust in the particular direction and, therefore, the helicopter advances in the particular direction.

In the known convertiplane, a wide range of maneuvers are carried out through the cyclic control.

For example, in known "Tilt-Rotor" convertiplanes, the yaw is controlled in the helicopter configuration by tilting forward the disk of one rotor and simultaneously tilting backward the disk of the other rotor.

As a result, one rotor generates a thrust in the forward direction and the other rotor generates a thrust in the backward direction.

These two thrusts are parallel and staggered each other, and therefore generates a yawing moment on the convertiplane.

In other words, yaw in hovering is controlled by making use of the cyclic control in the known convertiplanes.

As a result, yaw control results in considerable control moments acting on the shafts of the rotors.

These control moments cause considerable stresses in the shaft, which result in a reduced life-time of the rotors and in a high maintenance cost.

A need is felt within the industry to reduce the stresses generated on the rotors components by the yawing motion, so as to increase the life and reduce the maintenance cost of the rotors.

Furthermore, with reference to known convertiplanes, the maximum yawing moment and, therefore, the promptness of the yawing depends on the maximum variation of the angles of the attack of the rotor blades and on the distance between the axis of the rotors.

Accordingly, the promptness of yawing is penalized by the fact that there is an upper limit to the maximum variation of the angles of attack of the blades.

A need is felt within the industry to increase, as far as possible, the promptness of the yawing in the convertiplane.

Furthermore, also the low speed transition between the helicopter mode and the aeroplane is achieved through the inclination of the rotor disks, i.e. by cyclically varying the angles of attack of the blades.

Finally, known convertiplanes move rearward in a very similar way to traditional helicopters. More precisely, in the helicopter mode, disk rotors are inclined rearward, so as to generate a rearward thrust on the convertiplane.

Also in this case, shafts of the rotors are subjected to considerable control moments, and, therefore, to considerable resulting stresses.

A need is felt within the industry to reduce the stresses generated on the rotors components by the above-identified convertiplane motion, so as to increase the life and reduce the maintenance cost of the rotors.

SUMMARY OF THE INVENTION

It is an object of the present invention to provide a convertiplane, designed to meet at least one of the above requirement in a straightforward, low-cost manner.

According to the present invention, there is provided a convertiplane, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
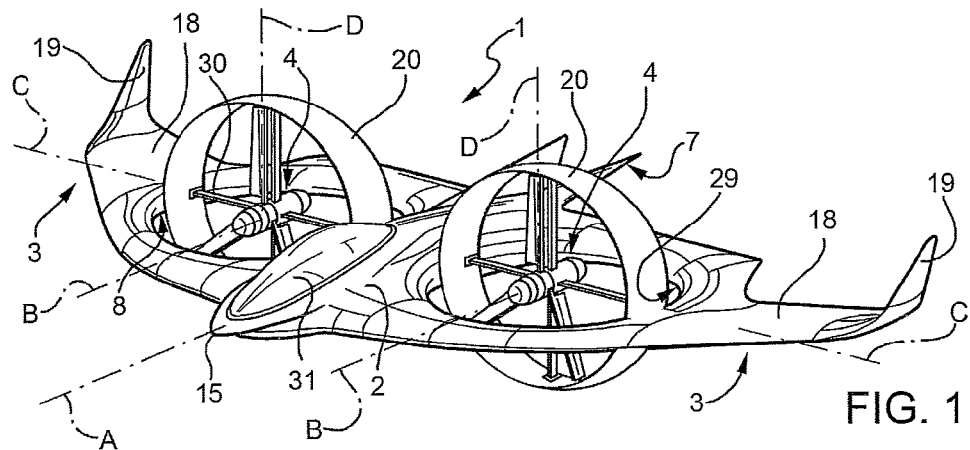
FIG. 1 is a perspective view of a convertiplane according to the invention in an airplane mode.
Figure 2:
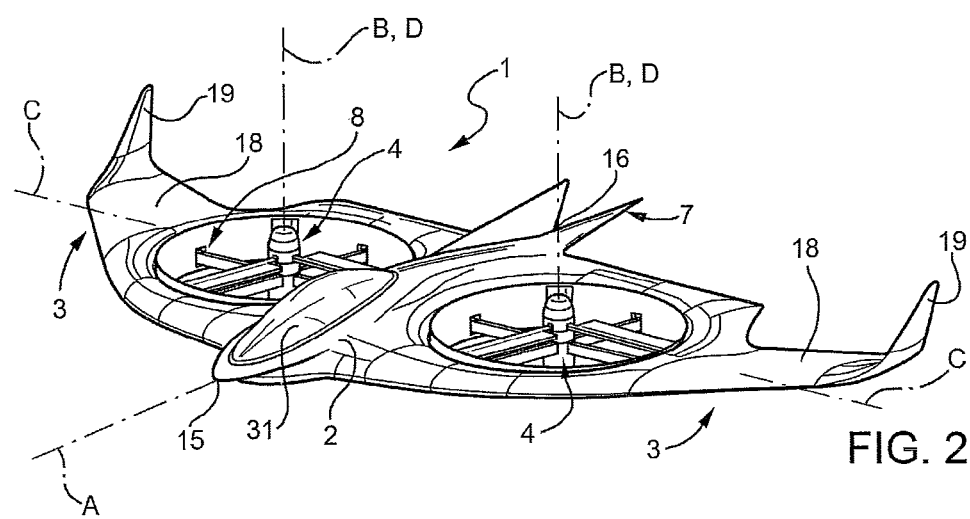
FIG. 2 is a perspective view of the convertiplane of FIG. 1 in a helicopter mode.
Figure 3:
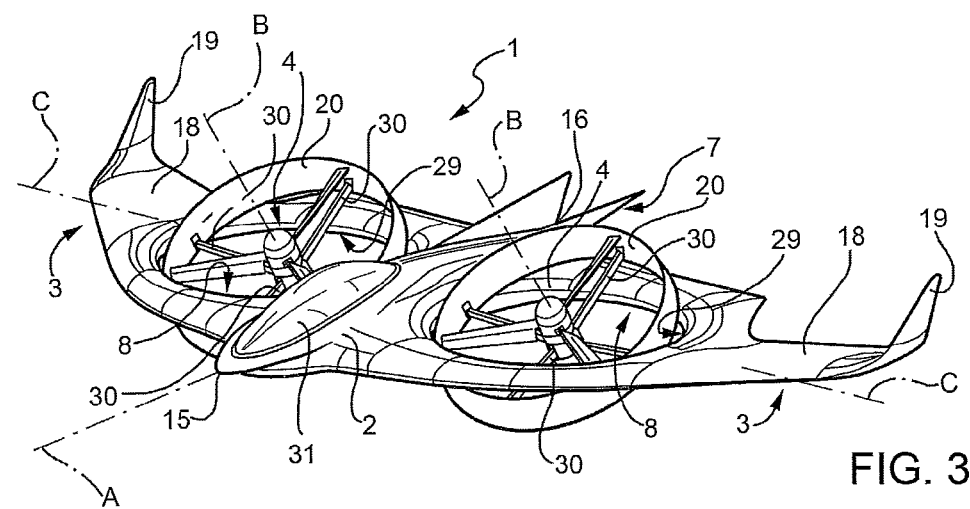
FIG. 3 is a perspective view of the convertiplane of FIGS. 1 and 2 in a transition mode between the helicopter and the aeroplane mode.

Number 1 in FIGS. 1 to 3 indicates as a whole a convertiplane, i.e. a hybrid aircraft capable of being selectively operated in an aeroplane mode (FIG. 1) or in a helicopter mode (FIG. 2).

Convertiplane 1 substantially comprises:
a fuselage 2 elongated along a longitudinal direction A of convertiplane 1;
a pair of semi-wings 3 which project on opposite respective lateral sides of fuselage 2; and
a pair of rotors 4.

In greater detail, fuselage 2 has a forward end 15 a backward end 16 which are opposite to each other, along direction A and define opposite ends of convertiplane 1.

Fuselage 2 also comprises (FIG. 6):
a forward portion 12 housing a cockpit 31; and
a backward portion 13.

Each rotor 4 substantially comprises:
a housing 5;
a shaft 6 supported by housing rotatably about a relative axis B; and
an ogive 14 rotatably integral with shaft 6 about relative axis B.

Each rotor 4 also comprises a plurality of blades 27, three in the embodiment shown, which are articulated relative to shaft 6 through the interposition of a hub 28.

In detail, rotors 4 rotate about relative axes B in opposite directions. In this way, convertiplane 1 does not need an anti-rotation device.

Figure 6:
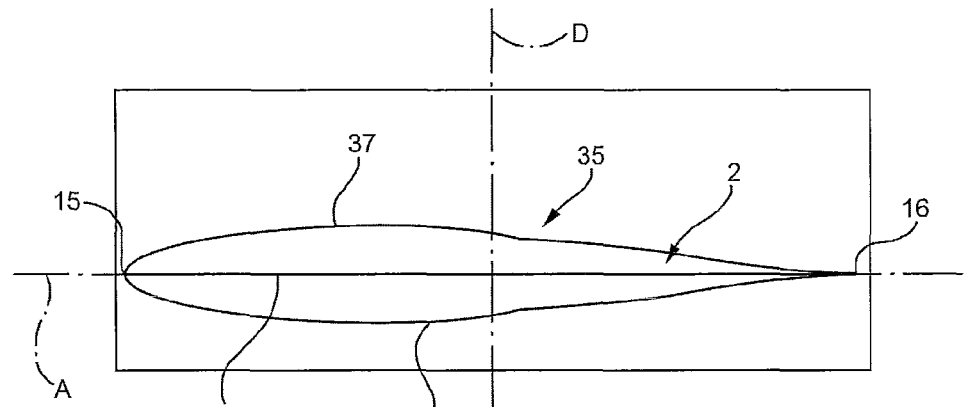
FIGS. 6 and 7 are cross sections of first components of FIG. 4 taken along lines VI-VI and VII-VII respectively of FIG. 6.

With reference to FIG. 6, the transversal section of fuselage 2 in a plane parallel to direction A and orthogonal to axis C is shaped as airfoil 35.

More precisely, airfoil 35 comprises:
a leading edge which is defined by end 15;
a trailing edge which is defined by end 16;
a topside 37 which joins ends 15, 16; and
a bottom side 38 which joins ends 15, 16 on the opposite side of topside 37.

Topside and bottom side 37, 38 are, in the embodiment shown both, convex.

Topside and bottom side 37, 38 are, in the embodiment shown, symmetrical relative to a rectilinear chord 39 which connects edges 15, 16.

Convertiplane 1 also comprises:
a V-shaped tail 7, which upwardly projects from portion 13 of fuselage 2; and
a plurality of landing gears 9 downwardly protruding from the bottom side of semi-wings 3.

Each rotor 4 may also tilt together with its respective axis B relative to respective semi-wing 3. In particular, rotor 4 and relative axis B tilt about a respective axis C which is orthogonal to direction A. Axes B are also orthogonal to relative axes C.

More precisely, axes B of rotors 4 are substantially orthogonal to direction A, when convertiplane 1 is operated in the helicopter mode (FIG. 2).

In this way, convertiplane 1 is a "so-called" tilt rotor convertiplane.

Axes B of rotors 4 are substantially parallel to direction A, when convertiplane 1 is operated in the aeroplane mode (FIG. 1).

Convertiplane 1 defines a pair of through openings 8 within which relative rotors 4 may tilt about relative axis C, when convertiplane 1 moves between helicopter and aeroplane mode.

In particular, each semi-wing 3 defines a relative opening 8.

Each semi-wing 3 substantially comprises:
a leading edge 10; and
a trailing edge 11 opposite to edge 10 and interacting with air current after edge 10, when convertiplane 1 is advanced along direction A.

Leading edges 10 converge, on respective opposite sides, towards fuselage 2, when proceeding from V-shaped tail 7 to end 15.

More precisely, the distance measured parallel to axis C between edges 10 decreases proceeding from V-shaped tail 7 to end 15.

Figure 4:
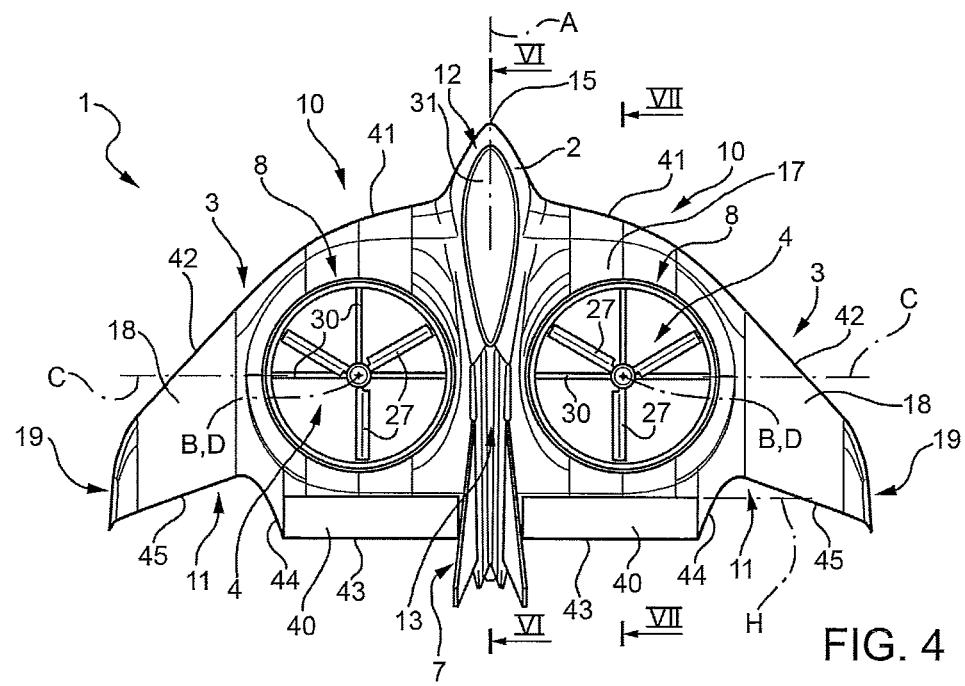
FIG. 4 is a top view of the convertiplane of FIGS. 1 to 3 in a first operative configuration.

Each leading edge 10 comprises (FIGS. 4 and 5):
a first curved stretch 41 laterally projecting on a relative side of fuselage 2; and
a rectilinear stretch 42 which defines a prolongation of stretch 41 on the relative opposite side of fuselage 8.

Each trailing edge 11 comprises:
a rectilinear stretch 43 extending parallel to direction C and on a relative lateral side of V-shaped tail 7;
a curved stretch 44; and
a rectilinear stretch 45 opposite to stretch 44 relative to stretch 43 and inclined relative to direction C.

As a result of the conformation of trailing and leading edges 11, 10, semi-wings 3 are configured as "so-called" delta wings.

Corresponding edges 42, 45 protrude upwardly from a plane defined by direction A and axis C, so as to form relative winglets 19 which are arranged on respective opposite sides of fuselage 2.

Each opening 8 is arranged between fuselage 2 and relative winglet 19 parallel to relative axis C and is arranged between edges 10, 11 parallel to direction A.

Each opening 8 extends about an axis D and is, in the embodiment shown, circular.

Furthermore, each opening 8 has an edge 29, circular in the embodiment shown.

When convertiplane 1 is operated in the aeroplane mode (FIG. 1), axes B are orthogonal to respective axes D and rotors 4 protrudes from opposite, top and bottom, sides of relative openings 8.

When convertiplane 1 is operated in the helicopter mode (FIG. 2), axes B are parallel to respective axes D and rotors 4 are axially contained within relative openings 8.

In particular, when convertiplane 1 is operated in the helicopter mode, the thickness of rotors 4 parallel to axes D is less than or equal to the thickness of relative openings 8 parallel to axes D.

Each semi-wing 3 comprises (FIGS. 4 and 5):
a body 17 which defines opening 8; and
a pair of outboard wings 18 are detachably connected to body 17 on respective opposite sides of fuselage 2.

Figure 5:
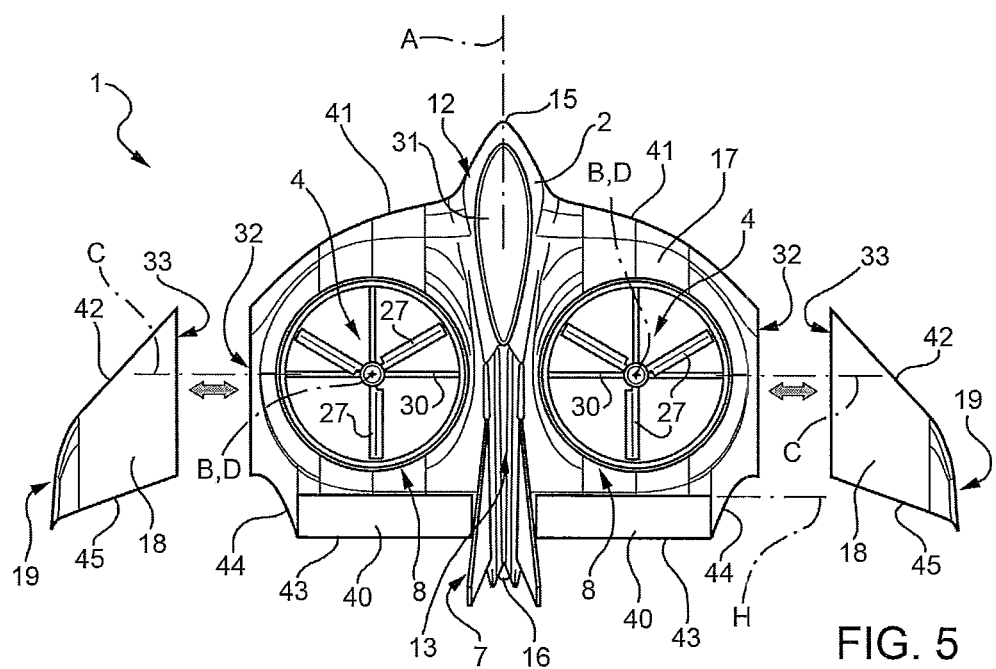
FIG. 5 is a top view of the convertiplane of FIGS. 1 to 3 in a second operative configuration.
Figure 8:
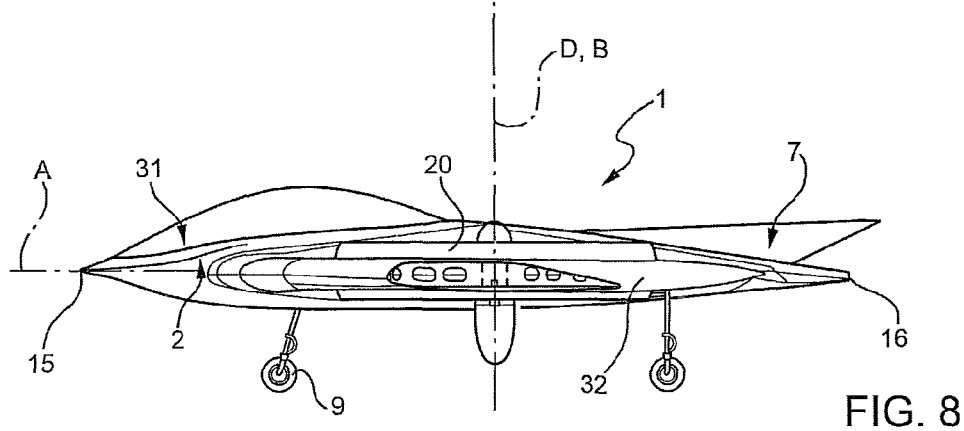
FIG. 8 is a lateral view of the convertiplane of FIGS. 1 to 3 in the second operative configuration.

As a result, convertiplane 1 may be operated:
in a first configuration in which wings 18 are connected to and project, on opposite sides of fuselage 2, from body 17 (FIGS. 4); and
in a second configuration, in which wings 18 are removed from body 17 (FIGS. 5 and 8).

More precisely, body 17 comprises fuselage 2 and V-shaped tail 7 and openings 8.

Body 17 is bounded by stretches 41, stretches 43, and by a pair of walls 32 which lies on a plane orthogonal to axis C.

Figure 7:
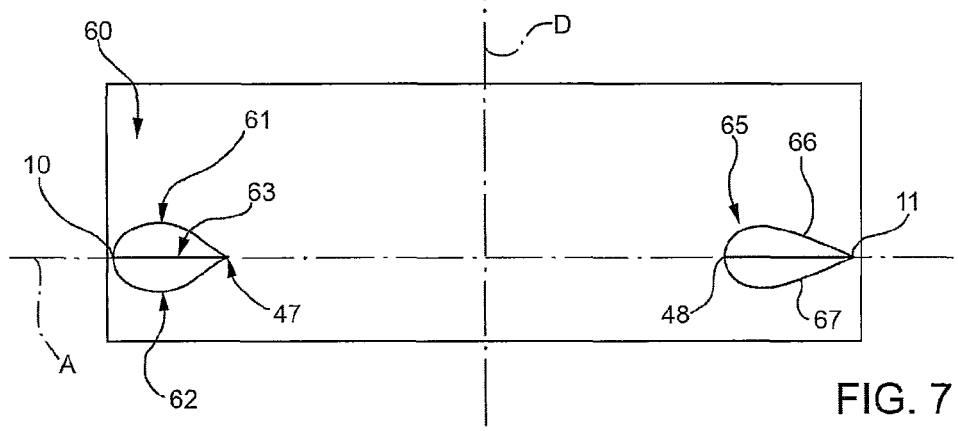

The cross section of body 17 taken in a plane orthogonal to axis C comprises a pair of airfoils 60, 65 (FIG. 7).

Airfoil 60 is bounded between a leading edge 10 and a forward portion 47 of edge 29 along direction A.

Airfoil 60 comprises a topside 61 and a bottom side 62 which join edge 10 and forward portion 47.

Airfoil 60 extends symmetrically about a rectilinear chord 63 which joins edge 11 and forward portion 47.

Topside and bottom side 61, 62 are, in the embodiment shown, both convex.

Proceeding from forward portion 47 of edge 29 to edge 10, the distance between topside and bottom side 61, 62 measured orthogonal to chord 63 is at first increasing and the decreasing.

Airfoil 65 is bounded between a rearward portion 48 of edge 29 and trailing edge 11 along direction A.

Airfoil 65 comprises a topside 66 and a bottom side 67 which join rearward portion 48 and edge 11.

Airfoil 65 extends symmetrically about a rectilinear chord 68 which joins edge 11 and forward portion 47.

Topside and bottom side 65, 66 are, in the embodiment shown, both convex.

Proceeding from edge 11 to rearward portion 48 of edge 29, the distance between topside and bottom side 61, 62 measured orthogonal to chord 68 is at first increasing and then decreasing.

Each wing 18 comprises relative winglet 19 and is bounded by relative stretches 42, 45 on opposite sides.

Each wing 18 is also bounded by a wall 33 on the opposite side of relative winglet 19.

Wall 33 of each wing 18 is detachably connected to a relative wall 32 of body 17.

Each wing 18 is, in particular, backward swept to provide roll stability and reducing wing span for obtaining a given amount of lift.

Convertiplane 1 also comprises pair of elevons 40 which are arranged on respective stretches 45 and on respective sides of V-shaped tail 7.

Elevons 40 are hinged to body 17 about an axis H parallel to axis C. In this way, elevons 40 may move upwardly and downwardly relative to body 17 for controlling the pitch and the roll during horizontal flight.

Due to the fact that rotors 4 protrude from semi-wings 3, when convertiplane 1 is operated as an aircraft, the airflow speed acting on elevons 40 is particularly high, so increasing the effectiveness of elevons 40.

Each rotor 4 comprises:
an annular shroud 20 which ducts relative blades 27; and
a plurality of spokes 30 which are, on relative opposite edges, to relative shroud 20 and housing 5.

In this way, shroud 20 and spokes 30 rotate integrally with blades 27 of each rotor 4 about relative axis C, when convertiplane 1 moves from helicopter and aeroplane mode and vice-versa.

On the contrary, shroud 20 and spokes 30 are fixed relative to axis B of each rotor 4.

Figure 10:
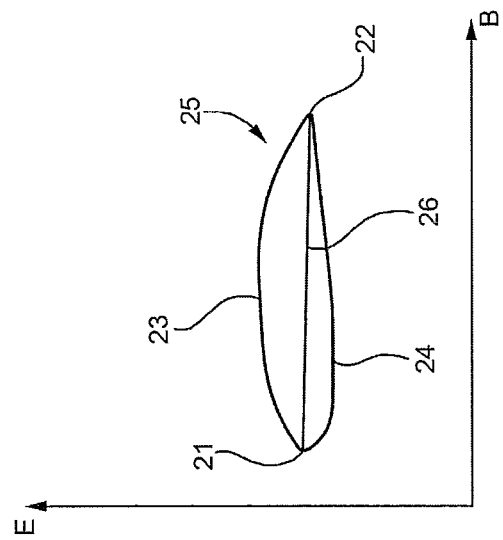
FIG. 10 is a cross section of the fourth component taken along line X-X of FIG. 9.
Figure 9:
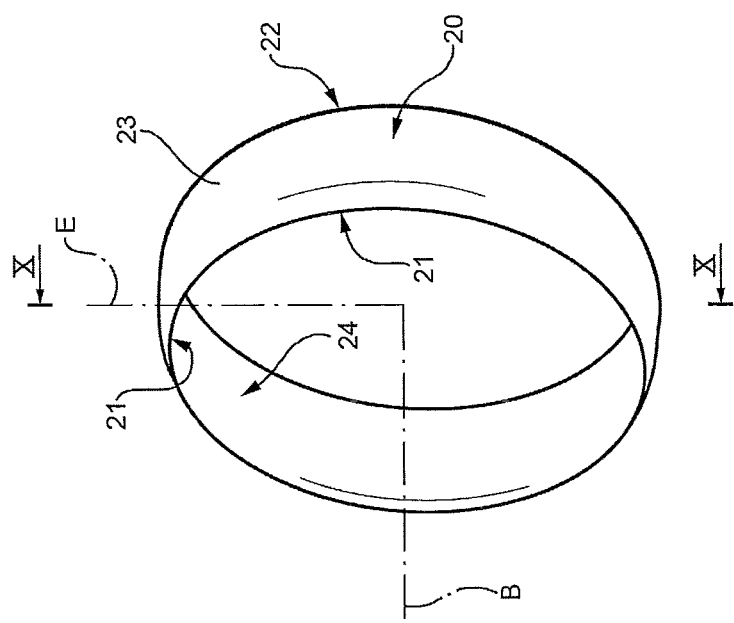
FIG. 9 is a perspective view of a further component of the convertiplane of FIGS. 1 to 4, with parts removed for clarity.

More in detail, each shroud 20 extends about relative axis B and has a thickness about a relative axis E orthogonal to relative axis B (FIGS. 9 and 10).

Each shroud 20 comprises:
a leading and a trailing edges 21, 22 which are opposite to each other along direction B;
a topside 23 which joins edges 21, 22; and
an bottom side 24 opposite to topside 23 and which joins edge 21, 22.

As evident from FIGS. 6 and 7, the cross section of shroud 20 taken in the plane defined by relative axes E, B is configured as an airfoil 25.

In other words, topside 23 and bottom side 24 are antisymmetrical relative to a chord 26 which joins leading and trailing edges 21, 22.

In detail, both topside 23 and bottom side 24 are convex.

Furthermore, the thickness of airfoil 25, i.e. the distance between topside 23 and bottom side 24 measured along direction F, at first increases and then decreases, proceeding from leading edge 21 to trailing edge 22.

Advantageously, rotors 4 about relative axes may tilt independently of each other.

Figure 11:
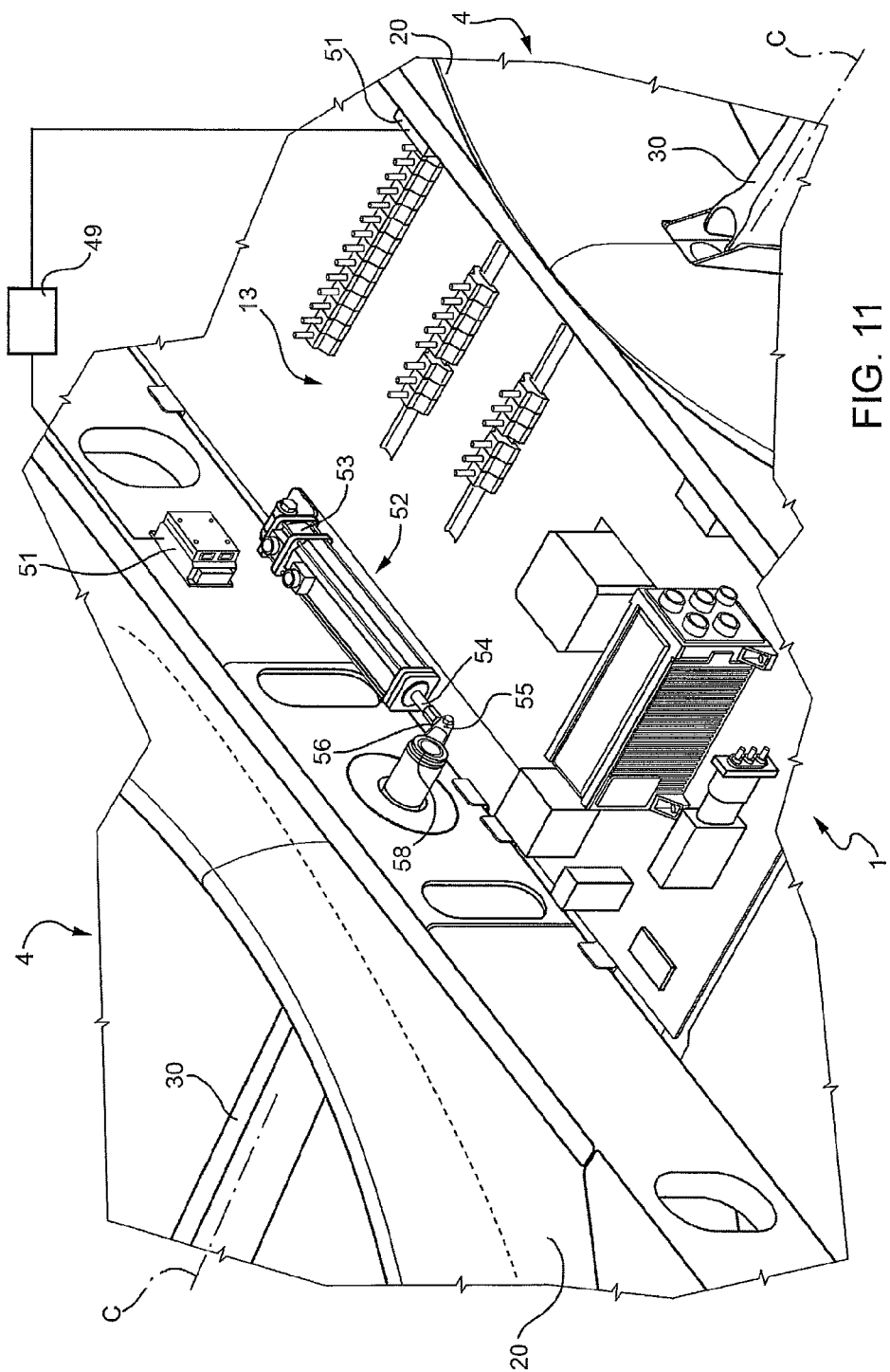
FIGS. 11 to 17 are perspective view of respective components of the convertiplane of FIGS. 1 to 4, with parts removed for clarity.

In detail, convertiplane 1 comprises:
a pair of actuators 52 operatively connected to relative rotors 4 and adapted to tilt rotors 4 about relative axes C; and
a flight control system 49 (only schematically shown in FIG. 11) adapted to control actuators 52 independently from each other, so that rotors 4 may tilt about relative axes C independently from each other.

Each actuator 52 comprises, in turn,
a fixed part 53;
a ram 54 which may slide parallel to direction A relative to part 53; and
a rod 55 having a first end 56 hinged to ram 54 about an axis parallel to axis C, and end 58 which integrally tilts together with shroud 20 of rotor 4 about axis C.

Each actuator 52 also comprises a control unit 51 for controlling the movement of ram 54 parallel to direction A.

Control units 51 are, in turn, controlled by flight control system 49 on the basis of a plurality of flight and mission parameters.

The movement of ram 54 relative to fixed part 53 is caused by an electric motor (not-shown).

Furthermore, each actuator 52 comprises a bar 59 which extends parallel to relative axis C.

Bar 59 of each actuator 52 comprises (FIGS. 11 and 12):
an end 90 integral with end 58 of rod 55; and
an end 91 opposite to end 90 and fitted to shroud 20.

Figure 12:
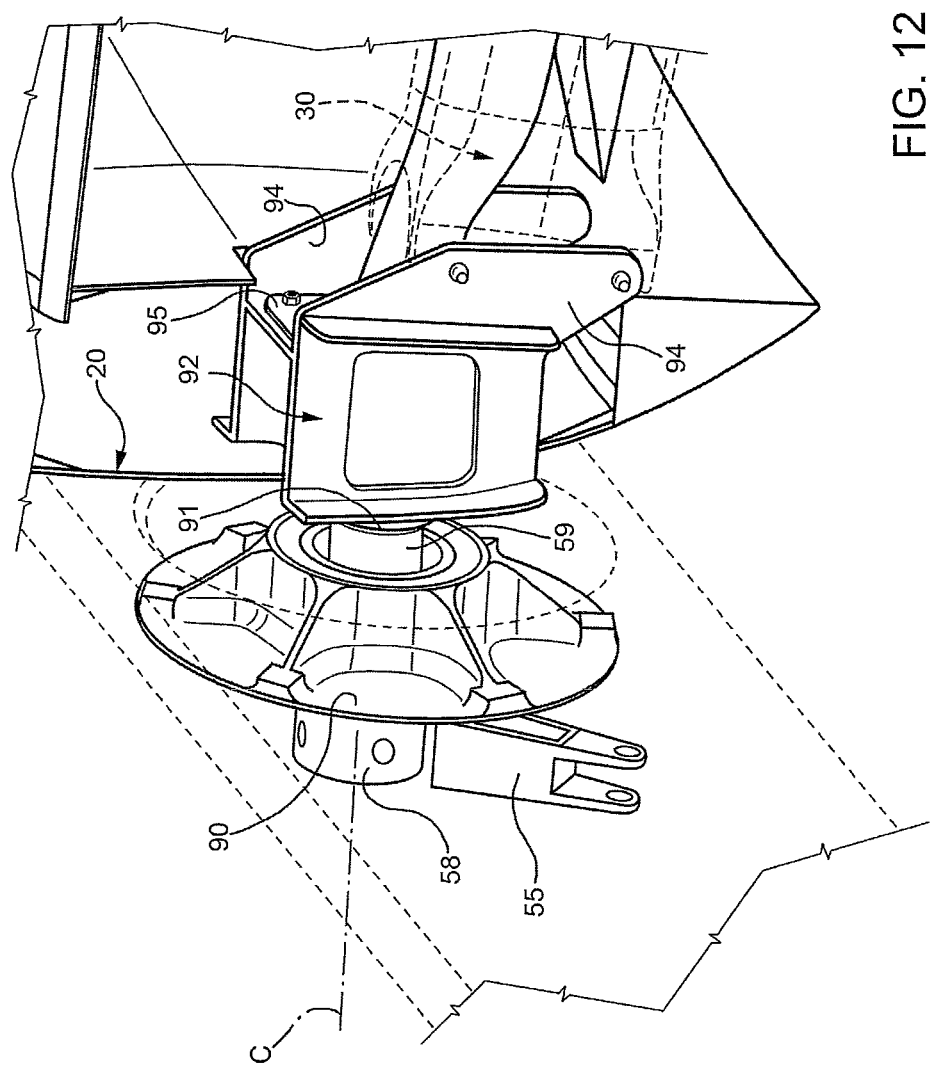

More precisely, convertiplane 1 comprises a plurality of connecting elements 92 (only one of which is shown in FIG. 12) for connecting relative spokes 30 to shroud 20.

In detail, each connecting element 92 comprises a pair of walls 94 fitted to relative spoke 30, and a central portion 95 fitted to a peripheral portion of shroud 20 and coupled with end 91 of bar 59.

In particular, each end 91 and corresponding central portion 95 are coupled by using a splined fitting.

In detail, central portions 95 and ends 91 of bars 59 are partially housed within a cavity defined by shroud 20 (FIG. 12).

Starting from helicopter mode, each actuator 52 may tilt relative rotor 4 towards end 15 or towards end 16.

In other words, during the transition from helicopter to airplane mode, each actuator 52 may tilt relative rotor 4 forward or rearwards relative to axis D.

With reference to FIGS. 13 to 16, convertiplane 1 comprises an electrical power storage device 70; and two pairs of electric machines 71.

Each electric machine 71 comprises, in turn, a stator 72 electrically connected to storage device 70, and a rotor 73 connected to shaft 6 of relative rotor 4.

Each electric machine 71 may be operated as:
an electric motor to directly drive in rotation relative shaft 6 about relative axes B, by using the electrical power stored in storage device 70; or
as an electrical power generator for re-charging storage device 70, by causing the rotation of rotor 4 using wind energy.

In particular, rotors 73 are directly connected to shafts 6.

In the present description, the expression "directly connected" is used to indicate that no transmission system is interposed between rotor 73 and shaft 6. Accordingly, the angular speed about axes B of shaft 6 and relative rotors 73 is equal.

In detail, when electric machines 71 are operated as electric motors, they are fed with electrical current by storage device 70.

Figure 13:
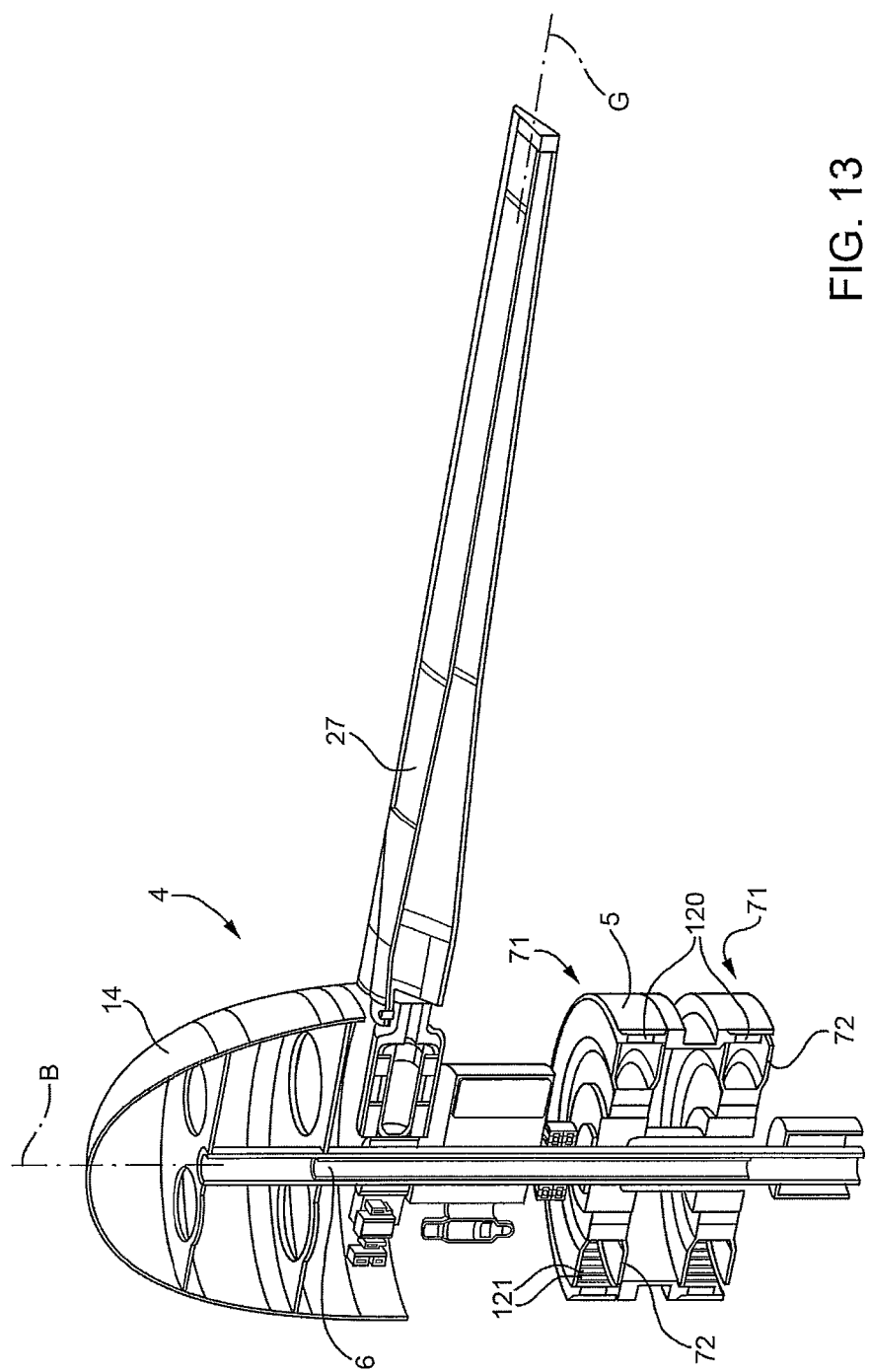

In detail, stator 72 of each electric machine 71 is fitted within housing 5 of relative rotor 4; and rotor 73 of each electric machine 71 is rotatably supported by stator 72 (FIG. 13).

Stator 72 of each electric machine 71 comprises an annular body 120 elongated along relative axes B and defining a plurality of angularly-spaced seats 121. In particular, seats 121 of each electric machine 71 extend radially relative to respective axis B.

Figure 14:
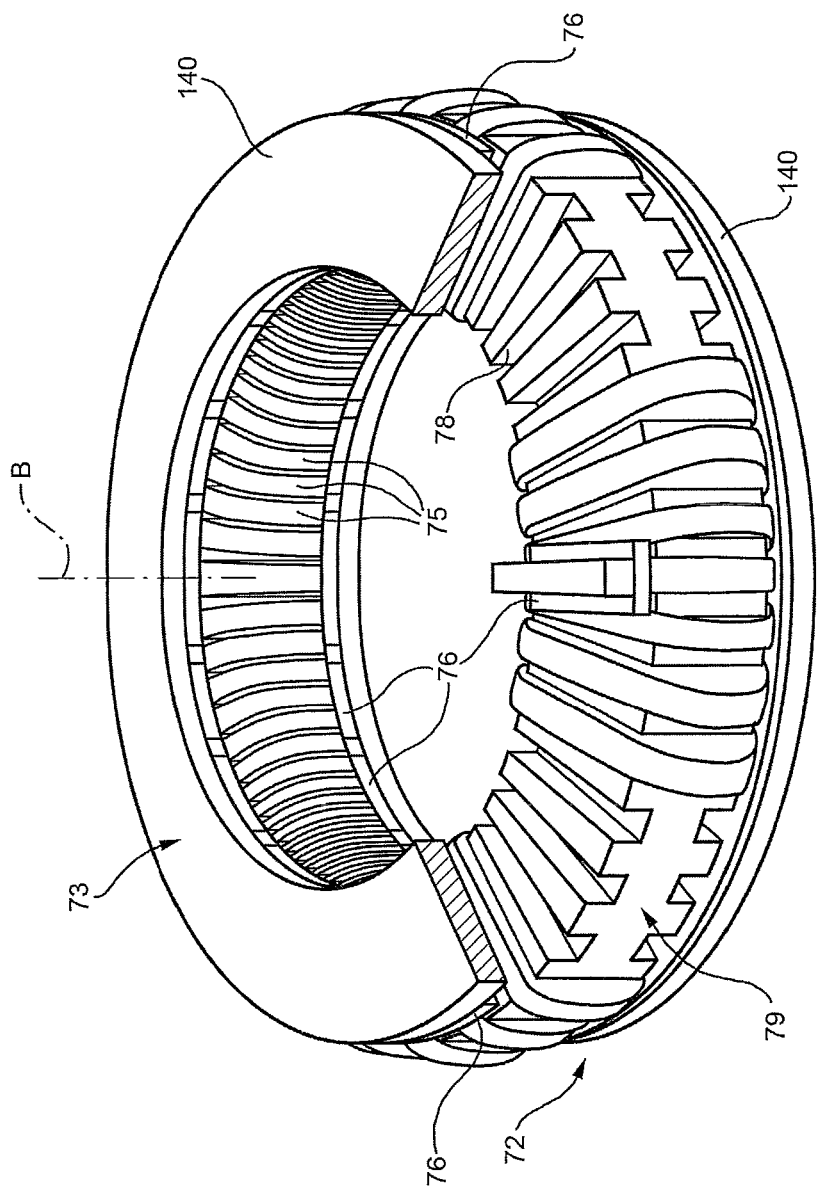

Stator 72 also comprises a magnetic core 79 which defines a helical slot 78 (not shown in FIG. 13 but only in FIG. 14).

Core 79 is housed within body 120 and slot 78 is annular relative to axis B.

Rotor 73 of each electric machine 71 comprises a pair of annular plates arranged on relative opposite axial sides of relative stator 72.

Electric machines 71 are, in the embodiment shown, axial flux brushless electric machines, i.e. of the type that generates a magnetic flux predominantly extending about axis B.

Each electric machine 71 also comprises:
a plurality of coils 75 which are wound on core 79, housed within slot 78, and are fed, in use, with alternate current by storage device 70; and
a plurality of permanent magnets 76 which are angularly integral with rotor 73 and axially interposed between plates of rotors 73 and body 120, so as to be driven in rotation about relative axis B by the magnetic field generated by coils 75.

Permanent magnets 76 of each electric machine 71 are angularly equi-spaced about relative axis B.

Electric machines 71 of each rotor 4 are arranged in series in relation to shaft 6. In other words, the overall torque to which shaft 6 is subjected about axis B equals the sum of torques exerted by each electric motor 71.

Coils 75 are electrically connected to storage device 70 by using wires.

Storage device 70 may comprise (FIGS. 15 and 16):

either one or more electrical battery 81; or
a hybrid battery 82 and an internal combustion engine 83 operatively connected with said hybrid battery 82.

Figure 15:
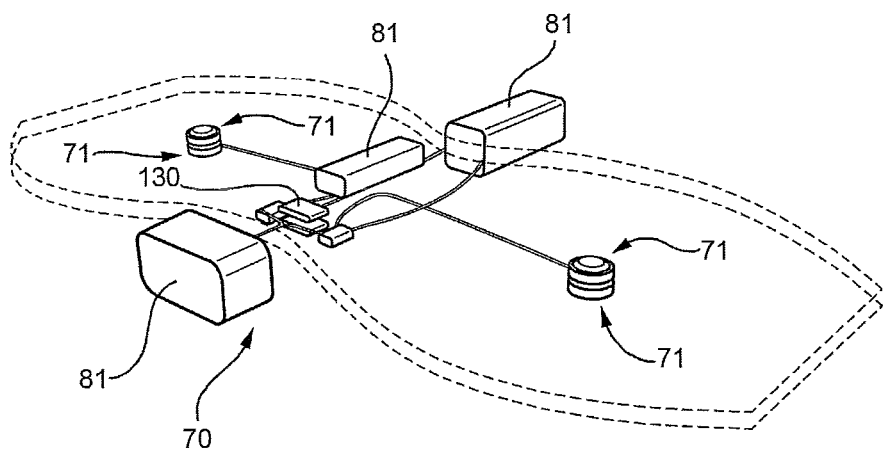
Figure 16:
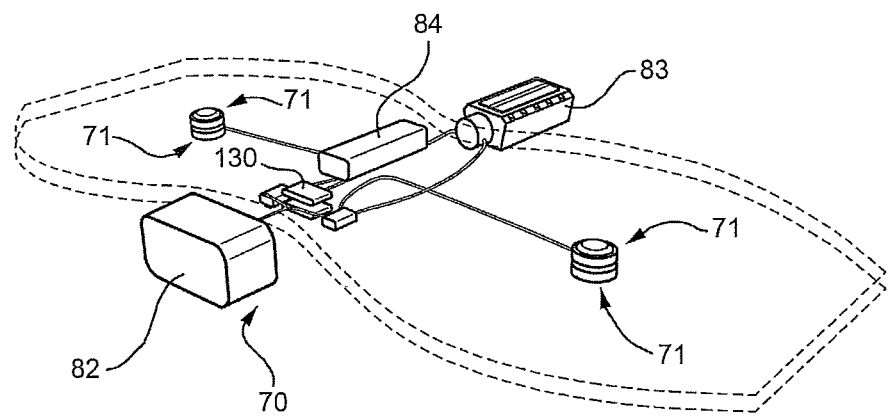

In the embodiment shown in FIG. 15, internal combustion engine 83 recharges hybrid battery 82. In particular, internal combustion engine 83 is a Diesel engine and comprises a tank 84.

Convertiplane 1 also comprises:
a common core which comprises, in turn, semi-wings 3, fuselage 2, rotors 4 and electrical machine 71; and
a module comprising storage device 70, which may be selectively connected to said common core.

Storage device 70 is, in the embodiment shown, a Li-Ion battery.

Convertiplane 1 also comprises a motor controller 130 (FIGS. 15 and 16) which receives electrical power from storage device 70 and regulates the power input into electrical machines 71 to control the motion of shafts 6 of rotors 4.

In detail, motor controller 130 is fed by storage device 70 with a continuous current, converts this continuous current into alternate current and feeds electrical machines 71 with alternate current.

Electric machines 71 may also be operated as an electrical generator during a braking phase of relative shaft 6. In this condition, electrical machines 71 generate electrical current which is stored within battery 81 or battery 82. In other words, electrical machines 71, when operated as an electrical generator, define braking means for braking shafts 6 of relative rotors 4.

Furthermore, convertiplane 1 may be arranged in the aeroplane mode, after that the landing has been completed.

In such a condition, the wind current acting on blades 27 causes the rotation of shaft 6.

Also in this condition, electrical machines 71 are operated as electrical generator and generate electrical current which is stored within storage device 70.

Actuators 52 and battery 81 (or 82) are arranged in portion 13 of fuselage 2.

Fuselage 2 may house a payload pallet and/or a sensor package.

Figure 17:
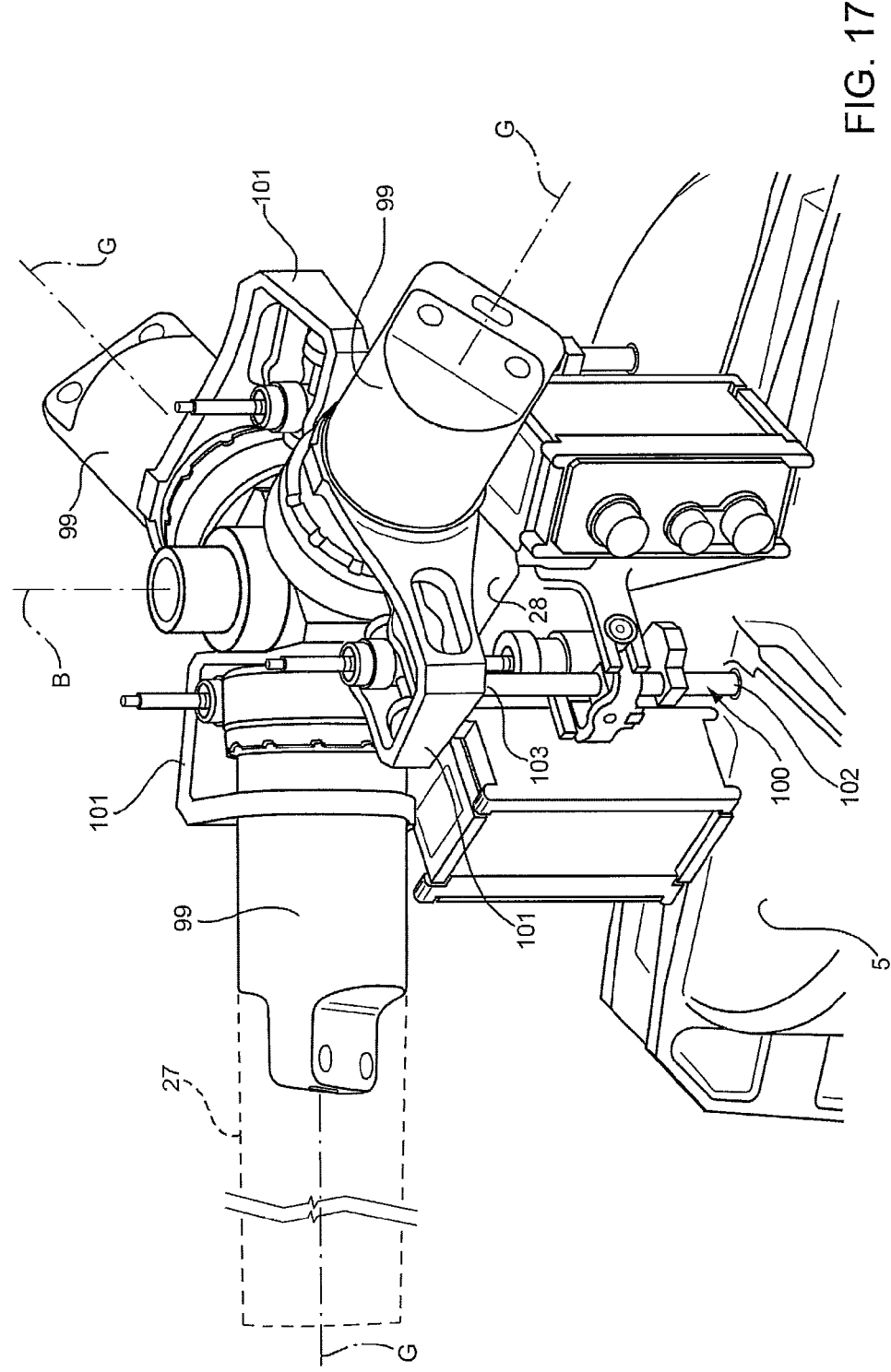

Convertiplane 1 also comprises, for each rotor 4, three variable-length actuators 100 which are interposed between housing 5 and relative blades 27 (FIG. 17).

In detail, each blade 27 (only schematically shown in FIG. 17) extends along a relative axis G and is connected to hub 28 by a relative root connecting element 99.

Each blade 27 comprises a C-shaped appendix 101 which is eccentric relative to respective axis G.

Each actuator 100 has a first end 102 connected to housing 5 and a second end 103 connected to appendix 101 of relative blade 27.

End 103 of each actuator 100 may also slide relative to end 102.

In this way, actuators 100 cause the rotation of relative blades 27 about relative axis G.

Accordingly, the angle of attack of each blade 27 is varied.

In particular, actuators 100 may both vary:
the angle of attack of all relative blades 27, i.e. the so-called "collective pitch"; and
the cyclical variation of the angles of attack of relative blades 27 during their rotation about axis B, i.e. the so-called "cyclic pitch".

Each actuator 100 may also be used for exerting a given force onto relative blade 27, so as to suppress the vibration of this blade 27.

In the embodiment shown, actuators 100 are electro-mechanical.

The operation of convertiplane 1 is described starting from a situation in which convertiplane 1 is operated in the helicopter mode and wings 18 are connected to body 17, which is formed by fuselage 2 and semi-wings 3.

This configuration is typical of the taking off and/or the landing of convertiplane 1.

Wings 18 are connected to body 17 when an increased value of lift is required.

In particular, when convertiplane 1 is operated in the helicopter mode, axes B are orthogonal to direction A and parallel to axes D. Furthermore, rotors 4 and relative shrouds 20 are fully contained within relative openings 8. In other words, the thickness of rotors 4 and shrouds 20 is contained within the size of relative openings 8 parallel to corresponding axes D.

Rotors 4 rotate about relative axes C in opposite direction relative to each other, so that the torques exerted by rotors 4 on convertiplane 1 are balanced.

In detail, shaft 6 of each rotor 4 is driven in rotation about relative axis B by relative each electric machines 71 which are operated, in this case, as electric motors.

Very briefly, coils 75 are fed with alternate current by storage device 70 and generate a variable magnetic flux on permanent magnets 76.

As a result, permanent magnets 76 and, therefore, rotor 73 and shafts 6 are driven in rotation about relative axis B.

Actuators 100 are used for both:
varying the angle of attack of all relative blades 27, thus varying the so-called "collective pitch"; and/or
varying the cyclical variation of the angles of attack of relative blades 27 during their rotation about axis B, thus varying the so-called "cyclic pitch".

Figure 18:
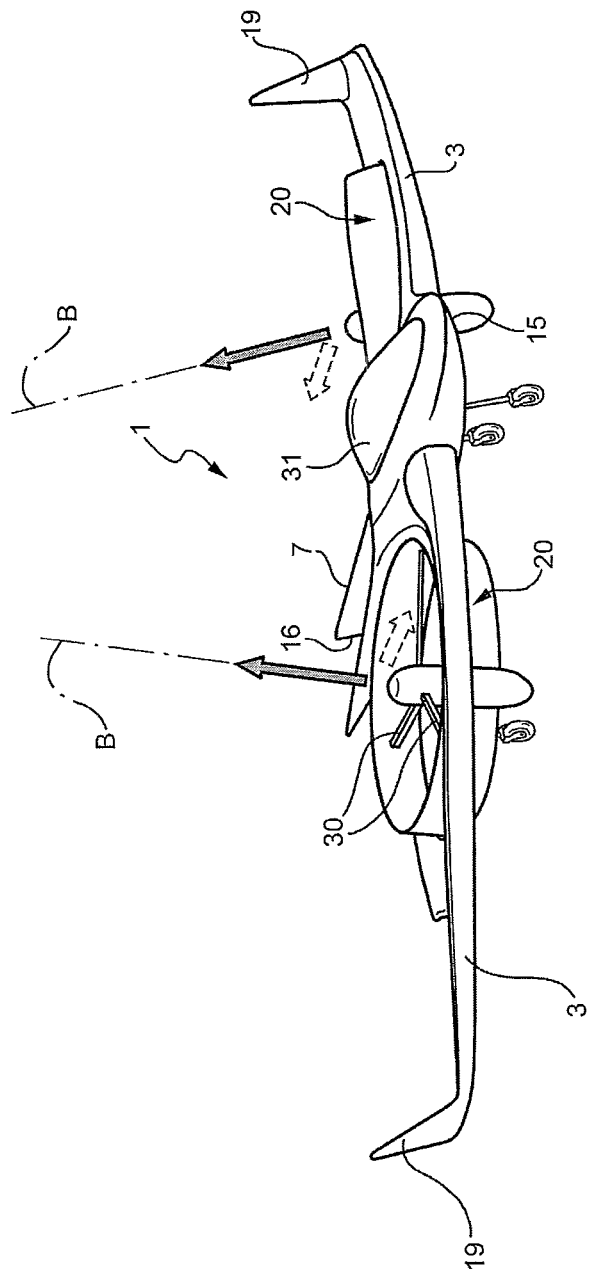
FIG. 18 schematically shows the yawing of the convertiplane of FIGS. 1 to 17.

When convertiplane 1 is operated in the helicopter mode, the yawing is controlled by tilting one rotor 4 towards end 15 of fuselage 2 and other rotor 4 towards end 16 of fuselage 2 (FIG. 18).

In this way, rotors 4 generate respective forces parallel to direction A which are equal and opposite to each other. As a result, rotor 4 may yaw.

In detail, flight control system 49 control actuators 52 which tilt relative rotors 4 about relative axes C and independently of each other.

Each control unit 51 controls the sliding of ram 54 parallel to direction A.

The translation of rams 54 causes the rotation of rods 55, and, therefore of relative rotors 4 and shrouds 20 about relative axes C.

When it is necessary to operate convertiplane 1 in the aeroplane mode, actuators 52 tilt rotors 4 and relative shrouds 20 about relative axes C and towards end 15.

In this way, axes B are firstly slightly inclined relative to axes D (FIG. 3) and then are arranged substantially parallel to direction A (FIG. 1).

When convertiplane 1 is operated in the aeroplane mode, rotors 4 and shrouds 20 protrude in part above relative semi-wings 3 and in part below semi-wings 3.

In this way, the airflow generated by rotors 4 impinge both the portion of semi-wings 3 arranged below rotors 4 and elevon 40.

Furthermore, convertiplane 1 flies, when operated in the aeroplane mode, with direction A slightly inclined relative to a horizontal plane, so that air current defines a not null angle with chords 39, 63, 68 of respective airfoils 36, 60, 65.

The majority of the lift is provided by wings 18. The remaining part of the lift is provided by fuselage 2 and shrouds 20 which duct relative rotors 4.

Winglets 19 increase the overall aerodynamic efficiency of convertiplane 1.

During horizontal flight, the roll and the pitch is controlled by rotating elevons 40 about axis H. In detail, elevons 40 may be controlled independently of each other.

V-shaped tail 7 ensures longitudinal stability in the horizontal flight, thanks to its not-shown customary movable vertical surfaces.

Rotors 4 can be braked by operating electrical machines 71 as alternate current electrical generator, instead of electric motor.

In this way, the deceleration of rotors 4 and, therefore, of shafts 6 cause the storage of electrical energy within batteries 81 (or 82).

In case that the mission profile requires convertiplane 1 mostly to be operated in the helicopter mode, wings 18 are detached from body 17, without changing the previously described operation of convertiplane 1.

Convertiplane 1 can move rearwards, by tilting both rotors 4 towards end 16, without varying the cyclical pitch of blades 27.

A low-speed transition between the helicopter mode and the aircraft mode may be achieved by tilting rotors 4 towards end 15 or end 16, without varying the cyclical pitch of blades 27. In this transition, fuselage 2 is kept level.

When convertiplane 1 is on ground and storage device 70 needs to be re-charged, rotors 4 are tilted about relative axes C in a direction facing the wind current.

At this stage, the wind current drives in rotation shafts 6 of rotors 4, which in turn, cause the rotation of rotors 73 of electrical machines 71 relative to stators 72.

In other words, electrical machines 71 are operated as electrical power generators which re-charge storage device 70.

The advantages of convertiplane 1 according to the present invention will be clear from the foregoing description.

In particular, rotors 4 may be tilted independently of each other about relative axes C.

In this way, when convertiplane 1 is operated as an helicopter, it is possible to generate a yawing moment without varying the collective pitch of blades 27 of rotors 4.

As a matter of fact, the yawing may be easily controlled by tilting one rotor 4 forwards (i.e. towards end 15) and the other rotor 4 rearwards (i.e. towards end 16) for the same angle relative to axis D (FIG. 18).

In this condition, the thrusts of rotors 4 generate respective forces parallel to direction A which are equal and staggered to each other, so resulting in a yaw moment acting on convertiplane 1 and parallel to axes B.

In the light of above, the yawing of convertiplane 1 may be achieved without intervening on the cyclic control of blades 27 of rotors 4.

As a result, the shafts 6 are subjected to reduced control moments and, therefore, to reduced stress, when compared with the solution described in the introductory part of the present description.

Accordingly, the life-time of rotors 4 is increased and the maintenance cost are reduced, when compared with the solution described in the introductory part of the present description.

Furthermore, the yaw moment available to convertiplane 1 is increased by the possibility of tilting one rotor 4 towards end 15 and the other rotor 4 towards end 16.

In this respect, it is important to mention that the greater is the angle between axes D and axes B of tilted rotors 4, the greater is the magnitude of yaw moment.

The limit situation is reached when axes B are parallel to direction A and rotors 4 are one tilted backwards and the other rearwards parallel to direction A.

In this situation, the yawing moment reaches a maximum value, which is equal to the thrust of each rotor 4 multiplied by the distance between axes C.

Furthermore, rotors 4 may tilt about relative axes C rearwards—i.e. towards end 16—, starting from the helicopter mode.

In this way, convertiplane 1 can move rearwards, without intervening on the cyclic control of blades 27 of rotors 4.

Finally, the forward (or backward) low-speed transition between helicopter and aeroplane mode may be carried out by simply tilting both rotors 4 about relative axes C and towards end 15 (or end 16).

During this low-speed transition, fuselage 2 is kept level.

Also in this case, there is no need of intervening on the cyclic control of blades 27 of rotors 4.

Accordingly, in the above-identified motions of convertiplane 1, shafts 6 are subjected to reduced control moments and, therefore, to reduced stress, when compared with the solution described in the introductory part of the present description.

Clearly, changes may be made to convertiplane 1 as described and illustrated herein without, however, departing from the scope of the present invention as defined in the accompanying claims.

The invention claimed is:

1. A convertiplane (1) comprising:
   a pair of semi-wings (3);
   a first and a second rotor (4) which may rotate about relative first axes (B) and tilt about relative second axes (C) together with said first axes (B) with respect to said semi-wings (3) between a helicopter mode and an aeroplane mode;
   said first axis (B) being, in use, transversal to a longitudinal direction (A) of said convertiplane (1) in said helicopter mode, and being, in use, substantially parallel to said longitudinal direction (A) in said aeroplane mode;
   said first and second rotor (4) being tiltable about relative second axes (C) independently of each other;
   said convertiplane (1) further comprising:
   a first actuator (52) operatively connected to said first rotor (4) and adapted to tilt said first rotor (4) about a relative second axis (C);
   a second actuator (52) operatively connected to said second rotor (4) and adapted to tilt said second rotor (4) about a relative second axis (C); and
   a flight control system (49) adapted to control first and second actuators (52) independently of each other;
   each said first and second actuator (50, 52) comprising:
   a control unit (51) controlled, in turn, by said flight control system (49) on the basis of a plurality of flight and mission parameters;
   a fixed part (53);
   a piston (54) slidable relative to said fixed part (53) and controlled, in use, by said control unit (51); and
   a rod (55) which may rotate about a relative said second axis (C), is hinged to said piston (54), and is connected to said relative first and second rotor (4), so as to cause the tilting of said first and second rotor (4) about relative second axis (C).

2. Convertiplane according to claim 1, characterized in that each said first and second rotor (4) may be tilted by respective first and second actuator (50) towards either a forward end (15) or a forward rear end (16) of said convertiplane (1), during a transition from said helicopter mode to said aeroplane mode.

3. A convertiplane according to claim 1, characterized in that each said first and second actuator (52) comprises an electrical motor for causing said piston (54) to slide relative to said fixed part (53).

4. Convertiplane according to claim 1, characterized by comprising a fuselage (2) from which said semi-wings (3) project on relative opposite sides;
   said fuselage (2) housing said first and second actuators (52).

5. Convertiplane according to claim 1, characterized by comprising a first shroud (20) which ducts and is connected to said first rotor (4);
   said first actuator (52) comprising a bar (59) which rotates, in use, about said axis (C) integral with said rod (55) and to said shroud (30).

6. Convertiplane according to claim 5, characterized in that said first rotor (4) comprises:
   a housing (5);
   plurality of spokes (30) interposed between said shroud (20) and said housing (5); and
   a plurality of connecting elements (92) for connecting relative spokes (30) to said shroud (20);
   said bar (59) being connected to one of said connecting elements (92).

\* \* \* \* \*